(12) United States Patent
Leidecker et al.

(10) Patent No.: US 6,269,734 B1
(45) Date of Patent: Aug. 7, 2001

(54) PISTON FOR A HYDRAULIC PISTON CYLINDER UNIT

(75) Inventors: Hans-Dieter Leidecker, Eschborn; Manfred Reuter, Weilmünster; Norman Langer, Liederbach; Jürgen Musolf; Thomas Kirschner, both of Frankfurt am Main; Volker Bartsch, Gifhorn; Holger Carota, Schwalbach; Klaus-Peter Walter, Edemissen; Winfried Gerhardt, Frankfurt am Main, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/529,356

(22) PCT Filed: Oct. 14, 1998

(86) PCT No.: PCT/EP98/06525

§ 371 Date: Aug. 4, 2000

§ 102(e) Date: Aug. 4, 2000

(87) PCT Pub. No.: WO99/37938

PCT Pub. Date: Jul. 29, 1999

(30) Foreign Application Priority Data

Oct. 17, 1997 (DE) .............................. 197 46 060

(51) Int. Cl.$^7$ ........................................ F16D 65/16
(52) U.S. Cl. ................................................. 92/208
(58) Field of Search .......................... 92/128, 172, 208; 188/72.4

(56) References Cited

U.S. PATENT DOCUMENTS

| | | |
|---|---|---|
| 3,409,106 | 11/1968 | Meier et al. . |
| 3,476,221 * | 11/1969 | Schanz .............................. 92/172 X |
| 3,532,030 * | 10/1970 | Margetts ............................... 92/208 |
| 4,170,926 | 10/1979 | Emmett . |
| 5,003,681 | 4/1991 | Schley ................................. 29/239 |
| 5,105,917 * | 4/1992 | Sporzynski et al. ............. 92/172 X |
| 5,231,916 * | 8/1993 | Weiler ................................ 92/172 |
| 5,988,044 * | 11/1999 | Meyer .............................. 92/172 X |

FOREIGN PATENT DOCUMENTS

| | | |
|---|---|---|
| 19 62 323 | 6/1967 | (DE) . |
| 14 80 315 | 7/1969 | (DE) . |
| 20 57 275 | 5/1972 | (DE) . |
| 38 33 552 | 4/1990 | (DE) . |
| 44 21 566 | 8/1995 | (DE) . |
| 0 578 569 | 1/1994 | (EP) . |
| 640149 * | 7/1928 | (FR) . |

OTHER PUBLICATIONS

Search Report of the German Patent Office for Application No. 197 46 060.7.
Alfred Teves: "Bremsen–Handbuch", Autohaus Publishing, pp. 157–159, 336; drawing 46 (1993).

* cited by examiner

*Primary Examiner*—John E. Ryznic
(74) *Attorney, Agent, or Firm*—Rader, Fishman & Grauer PLLC

(57) ABSTRACT

It is frequently important for the piston of a hydraulic piston-and-cylinder assembly, in particular the brake piston of a disc brake, which is slidably arranged within a cylinder bore to ensure a true-to-size mounting position of the piston inside the cylinder bore. Especially in the case of brake pistons of a disc brake, this determines the efficiency of provisions on the brake piston for reducing the occurrence of brake noises. According to the present invention, a key-type accommodation is provided on the piston which permits engagement by a matingly configured mounting means or mounting tool and, thus, renders possible the defined positioning of the piston within a cylinder bore.

4 Claims, 2 Drawing Sheets

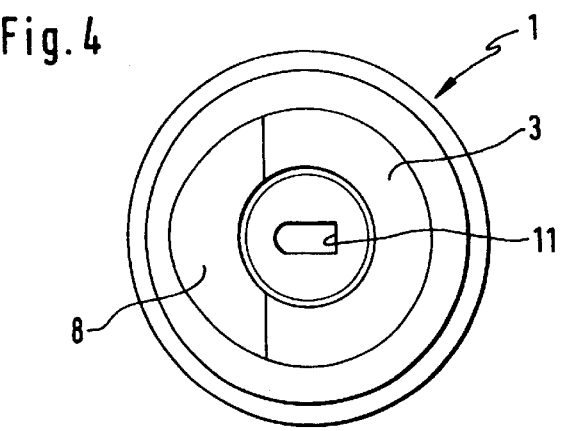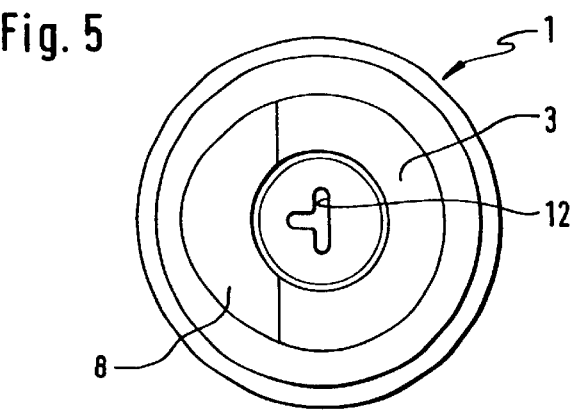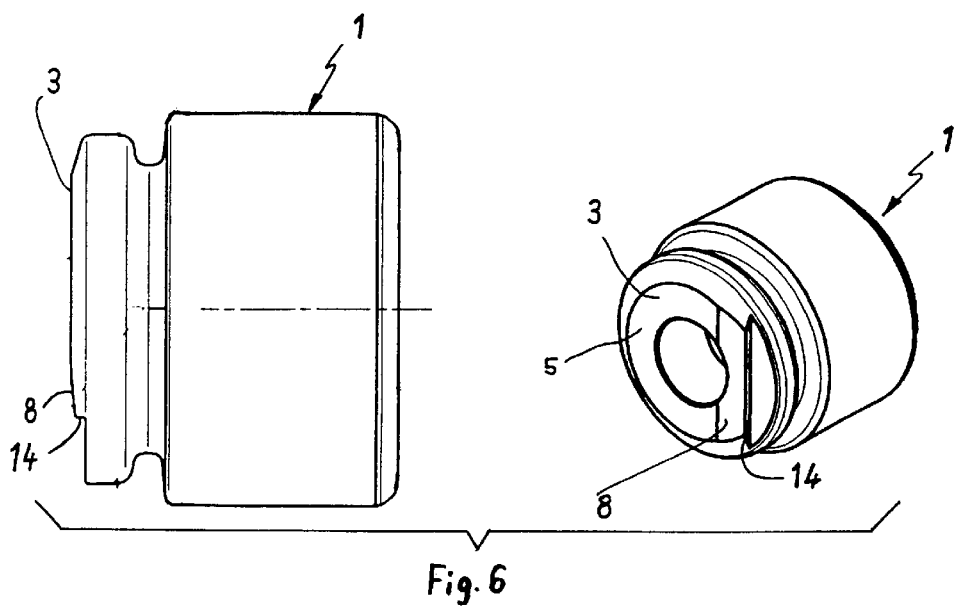

PISTON FOR A HYDRAULIC PISTON CYLINDER UNIT

TECHNICAL FIELD

The present invention relates to a piston for a hydraulic piston-and-cylinder assembly, in particular for a brake piston of a disc brake.

BACKGROUND OF THE INVENTION

Generic pistons of this type, when used as brake pistons in disc brakes, are among others also responsible for the production and/or transmission of undesirable brake noises. To reduce such brake noises, the brake pistons normally have an appropriate configuration. German patent application No. 38 33 552, for example, discloses a spot-type disc brake which has a generic bowl-shaped brake piston. The bowl-shaped brake piston bears with one front side against the back side of a brake lining, and the bowl bottom faces the hydraulic pressure chamber in the brake housing. On its end surface facing the friction lining, the brake piston has a step, with the result of a sickle-shaped, rather than an annular, abutment surface between the brake piston and the friction lining back plate. Such a sickle-shaped abutment between the brake piston and the brake lining produces a slight shift in the resulting pressure point between the brake piston and the brake lining and results in a positive reduction of brake noises. The result of such a modification of the brake piston for noise reduction purposes is the requirement of a true-to-size orientation or positioning of the brake piston within the brake cylinder, in particular in order to avoid an undesirable inclined positioning of the piston-side brake lining. Such a positioning is especially related to the exact angular position of the piston in relation to a rotation about the cylinder bore axis. In prior art brake piston designs, it is only to an insufficient extent not possible to position the brake piston inside the brake cylinder with sufficient accuracy to achieve the noise reduction results attained by the present invention.

An object of the present invention is to provide a piston for a hydraulic piston-and-cylinder assembly which is easy to mount and can be placed in a defined position within a cylinder bore.

Preferably, the piston includes a key-type tool accommodation suited for engagement by a mounting means of a corresponding configuration and intended for the defined positioning of the piston inside a cylinder bore. Thus, the piston can be arranged in a true-to-size fashion within a cylinder bore during the installation of the piston in the cylinder bore. More particularly, this ensures precisely maintaining the angular position with respect to a rotation about the cylinder bore axis.

According to a favorable design variation, the mounting means, which is particularly configured as a mating mounting tool, and the correspondingly configured accommodation in the piston are form-lockingly engaged similar to a male-female plug assembly. This permits applying the mounting means or tool only in one single position on the accommodation in the piston, thereby allowing a defined alignment of the piston inside the cylinder bore.

It is especially favorable to configure the above-mentioned accommodation on one of the front surfaces of the cylindrical piston or, with a substantially bowl-shaped configuration of the piston (as is the case particularly with brake pistons), on the inner surface of the brake piston bowl.

A design variation of the key-type accommodation which is particularly easy to achieve, results from the provision of a corresponding recess or projection on the piston. A recess or projection of this type permits, as has already been mentioned, the key-type defined engagement or application of an associated mounting means and has a correspondingly shaped contour (as can be taken from the drawings in particular).

Preferably, at least one of the end surfaces of the cylindrical piston has an inclined positioning, at least in sections, with respect to a plane which extends vertically to the direction of piston displacement. This achieves for a brake piston in a normal brake operation an inclined positioning of the piston inside the cylinder bore which is favorable to prevent brake noises. Favorably, a step which extends in a secant's direction of the piston takes its course through the chamfered surface. In its depth in the direction of piston displacement, this step is so dimensioned that it can be used for the exact positioning of the piston during installation by making use of optical means (for example, Laser, monitoring by means of pictures, video, etc.) for detection of the position of the piston. In a combination with the described positioning device for the brake piston, this permits taking effect on the development of brake noises.

BRIEF DESCRIPTION OF THE DRAWING

FIGS. 4 to 5 show a top view of a bowl-shaped brake piston with another variation of the design of the accommodation in the interior of the piston.

FIG. 6 shows two views of a bowl-shaped brake piston with a chamfered end surface portion and a step on the end surface.

DETAILED DESCRIPTION OF THE PREFERRED EMBODIMENT

Figure 1:
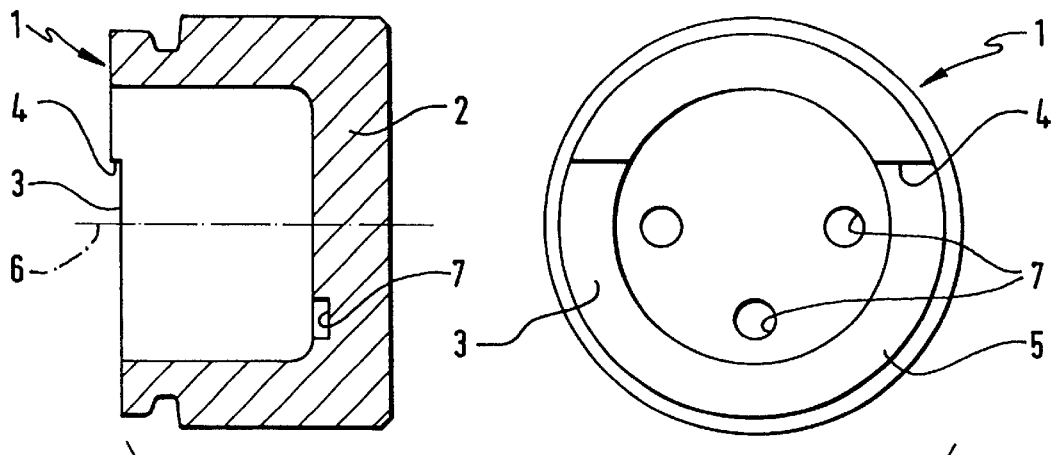
FIGS. 1 to 3 show two partly cross-sectional views of a bowl-shaped brake piston with a key-type accommodation in the interior of the piston.

The variations of brake pistons 1 shown in the embodiments of FIGS. 1 to 6 are all suitable for use in a disc brake (not shown) especially for automotive vehicles. Each of the brake pistons 1 is axially slidably supported in a cylinder bore of the brake housing. At its end facing the hydraulic pressure chamber within the brake housing, each cylindrical brake piston 1 has a bowl bottom 2 and a substantially annular end surface 3 on the opposite side of the brake piston for abutment of the brake piston 1 with a (non-illustrated) back plate of a brake lining. In detail, the brake piston 1, among others, influences the noise behavior of an associated automotive vehicle brake and, to this end, is frequently furnished with noise-reducing design features. These features especially include measures on the end surface 3 which have an effect on the contact surface between the non-illustrated brake lining and brake piston 1. In the FIG. 1 embodiment, for example, the design of a step 4 at end surface 3 is shown which causes a sickle-shaped abutment 5 of the brake piston 1 on the brake lining. In addition, step 4 at end surface 3 causes an inclined position of the brake piston 1 within the cylinder bore which is favorable with respect to noise reduction. The amount of the inclined position of the brake piston 1 and the sickle-shaped abutment 5 is greatly dependent on a true-to-size positioning of the brake piston 1 inside the cylinder bore (not shown). It is in particular significant in which angular position, with respect to a rotation about the cylinder bore axis 6, the brake piston 1 is positioned within the cylinder bore during the installation. On the basis of a non-occurring rotation of the brake piston within the cylinder bore during brake operation it is already during the precisely positioned assembly of the brake piston 1 that major influence is taken on the efficiency of noise-reducing provisions on the brake piston 1. Consequently, the efficiency of the sickle-shaped abutment 5 of the inclined position of the piston is determined during the exactly positioned installation of the brake piston.

To this end, a key-type accommodation is provided on the brake piston 1 into which a correspondingly configured mounting means, in particular an associated mounting tool, may engage in order to position the brake piston 1 inside the cylinder bore. With an appropriate dimensioning of the step 4 at the end surface 3, a mounting tool of this type may easily make catch at the said step 4 and place the brake piston 1 during mounting in a precisely defined angular position within the cylinder bore. When the step 4 has an especially flat design, the application surface for a tool is insufficient, what requires the provision of an additional accommodation for a mounting means.

Apart from the design variations illustrated in the Figures, it is possible in an especially advantageous manner to provide a groove-shaped indentation in the annular end surface 3 of the piston 1 and to use this indentation for the rotationally exact positioning of the piston during installation. A corresponding mounting means may engage into such a groove-shaped indentation and perform the exactly positioned installation, and the position of the piston can be determined and controlled especially by use of optical auxiliary means or sensors (for example, Laser, monitoring by means of pictures, video, etc.).

Three indentations 7 in a semicircle are shaped into the bowl bottom 2 in the piston interior according to FIG. 1. The indentations 7 may be simple circular holes which are provided in the bowl bottom 2 already during manufacture of the entire brake piston 1. The special arrangement of the indentations 7 in the bowl bottom 2 permits the defined application of a matingly configured mounting tool with associated key-type projections which form-locking engage into the associated indentations. The mounting tool can only be applied in one single position on the brake piston 1 which prevents the risk of faulty assembly. Accordingly, the brake piston 1 can be inserted into the associated cylinder bore with a defined angular position with respect to a rotation about the cylinder bore axis 6.

Figure 2:
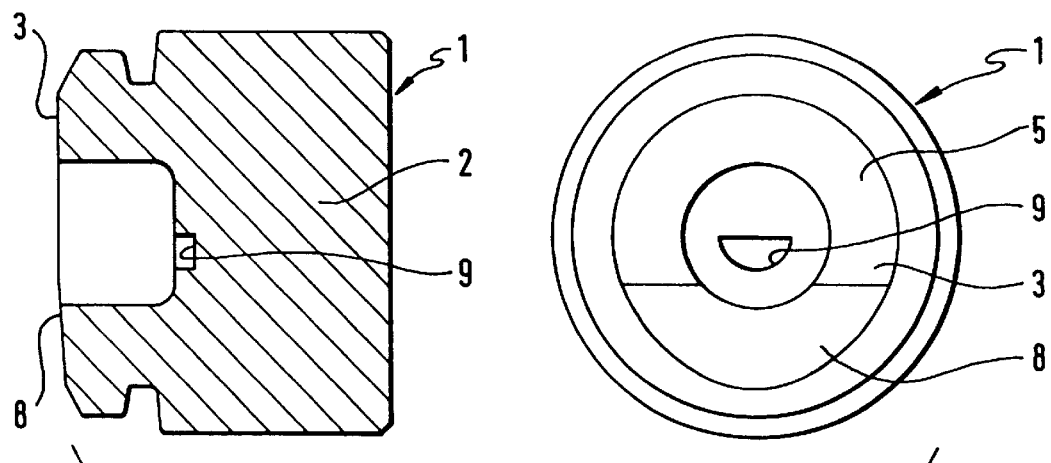
Figure 3:
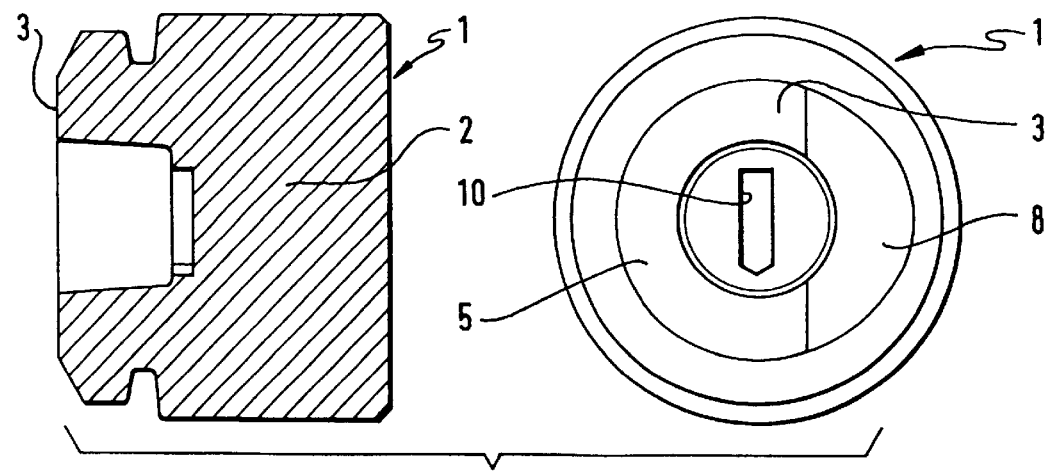

Further variations of a key-type accommodation in the interior of a bowl-shaped brake piston 1 can be seen in FIGS. 2 to 6. According to a preferred aspect of the invention, the brake piston 1 of the FIGS. 2 to 6 embodiments includes an inclined portion 8 on its end surface 3 which faces the brake lining (not shown). Arranging such an inclination 8 on the end surface 3, compared to a step 4 in FIG. 1, has advantages especially with regard to tension. The tension peaks which occur in the area of step 4 in an arrangement as disclosed in FIG. 1 are eliminated in an arrangement according to FIG. 2 because there is an almost continuous transition between the sickle-shaped abutment surface 5 and the inclined portion 8. The arrangement of an inclined portion 8 on the brake piston end surface 3 thus proves particularly favorable in brake piston designs made of plastics or aluminum. The key-type tool accommodation in FIG. 2 is a semicircular recess 9 in the bowl bottom 2.

All other Figures show two design variations of a slot-shaped recess (FIG. 3, FIG. 4) and a T-shaped contour of the recess (FIG. 5), each inside the bowl bottom 2. It is not absolutely necessary to arrange slot-shaped or groove-shaped recesses of this type in the interior of the bowl-shaped piston. Accordingly, they may of course also be provided at a different location, especially on the end surface 3 which is close to the brake lining. The different design variations of the tool accommodation 7, 9, 10, 11, 12 have a similar functioning and permit the precise application of the mounting tool with a correspondingly shaped key-type attachment in a defined angular position. The configuration of the key-type accommodation of the brake piston is, of course, not limited to the design variations shown and permits applying the principle of the present invention to any desired contour of a workpiece holding fixture which renders possible a defined engagement by an associated, fitting mounting means and, thus, a defined positioning of the brake piston 1 within the cylinder bore.

The embodiment of FIG. 6 shows a brake piston 1 of the present invention which includes the above-mentioned chamfered surface portion 8 at its end surface 3 which is close to the brake lining (not shown). The inclination 8 is defined by a step 14 in the direction of piston displacement which extends in a secant's direction of the cylindrical brake piston 1. The depth of the step 14 in the direction of piston displacement is so dimensioned that it is appropriate for the application of a mating auxiliary mounting means for the rotationally exact positioning of the piston. Similar to the design variation shown in FIG. 6, the step 14 in the secant's direction of the piston may take its course through the chamfered surface portion 8 so that inclined partial surfaces extend on either side of the step 14. In addition, it is provided to determine and control the piston position during installation by making use of optical means or sensors (for example, Laser, monitoring by means of pictures, video, etc.). This permits an automatic piston installation with a rotationally exact positioning irrespective of the feeding of the individual brake pistons to the mounting device.

Further, the arrangement of a positioning device is not bound to being employed on brake pistons for disc brakes. Rather, it can be applied to any pistons of a hydraulic piston-and cylinder assembly where a precisely positioned installation of the piston within a cylinder bore is required. It is of great significance that the mounting means and the mating accommodation in the piston form-lockingly engage each other, for example, similar to a male-female plug assembly. It is of no importance, however, whether the accommodation 7, 9, 10, 11, 12 in the piston 1 exhibits a male or a female configuration.

What is claimed is:

1. Piston for a hydraulic piston-and-cylinder assembly, comprising:

a piston body having a bowl shaped portion and having a key accommodation portion for the defined positioning of the piston body, wherein the accommodation portion is shaped as at least one recess or projection into the bowl shaped portion.

2. Piston for a hydraulic piston-and-cylinder assembly, comprising:

a piston body having a bowl-type configuration, wherein said piston body includes an accommodation portion for the defined positioning of the piston, wherein at least one end surface of the cylindrical piston has an inclined surface portion with an indentation for engagement of an associated mounting means.

3. Piston for a hydraulic piston-and-cylinder assembly, comprising:

a cylindrical piston body having a bowl-type configuration and an accommodation portion for the defined positioning of the piston, wherein the piston body includes at least one end surface generally oriented 90°, with respect to the side walls of the cylindrical piston body, and wherein said at least one end surface has an inclined surface portion on which is provided a step that extends in a secant's direction of the cylindrical piston.

4. Piston as claimed in claim 3, wherein the step defines the inclined surface portion.

* * * * *